United States Patent
Ayestaran Basagoitia et al.

(10) Patent No.: US 10,012,328 B2
(45) Date of Patent: Jul. 3, 2018

(54) FOUNDATIONS FOR SUBSEA PIPELINE ACCESSORIES

(71) Applicant: Acergy France SAS, Suresnes (FR)

(72) Inventors: Leire Ayestaran Basagoitia, Tolosa (ES); Brice Viellard, Boulogne-Billancourt (FR); Florent Menet, Bezu-Saint-Eloi (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 14/392,132

(22) PCT Filed: Jun. 23, 2014

(86) PCT No.: PCT/IB2014/001744
§ 371 (c)(1),
(2) Date: Dec. 23, 2015

(87) PCT Pub. No.: WO2014/207560
PCT Pub. Date: Dec. 31, 2014

(65) Prior Publication Data
US 2016/0169414 A1    Jun. 16, 2016

(30) Foreign Application Priority Data
Jun. 25, 2013  (GB) .................................. 1311275.0

(51) Int. Cl.
*F16L 1/12*    (2006.01)
*F16L 1/16*    (2006.01)
(Continued)

(52) U.S. Cl.
CPC ................. *F16L 1/123* (2013.01); *F16L 1/16* (2013.01); *F16L 1/20* (2013.01); *F16L 1/26* (2013.01); *F16L 3/00* (2013.01)

(58) Field of Classification Search
CPC ..... F16L 1/12; F16L 1/123; F16L 1/16; F16L 1/20; F16L 1/201; F16L 1/26; F16L 3/00
See application file for complete search history.

(56) References Cited

U.S. PATENT DOCUMENTS 4,147,455 A    4/1979  Bertaccini
5,425,599 A  *  6/1995  Hall ........................ F16L 1/26
                                                    405/158
(Continued)

FOREIGN PATENT DOCUMENTS

GB    2 070 187    9/1981
GB    2 323 907    10/1998
(Continued)

*Primary Examiner* — Frederick L Lagman
*Assistant Examiner* — Stacy N Warren
(74) *Attorney, Agent, or Firm* — Levy & Grandinetti (57) ABSTRACT

A pipeline including an accessory such as a flowline end termination or an in-line tee is lowered to the seabed and a mudmat foundation is subsequently lowered toward the seabed for subsea docking with the accessory to provide a permanent foundation support for the accessory. Once docked and with a mudmat of the foundation landed on the seabed, weight loads of the accessory structure and the attached pipe are transferred to the mudmat to provide a permanent foundation for the accessory structure. Before and during installation of the mudmat foundation, the pipe may be allowed to become embedded in the seabed. Temporary interim support such as buoyancy may be provided to the accessory to limit embedment into the seabed.

16 Claims, 9 Drawing Sheets

(51) Int. Cl.
   *F16L 1/20*   (2006.01)
   *F16L 3/00*   (2006.01)
   *F16L 1/26*   (2006.01)

(56) References Cited

U.S. PATENT DOCUMENTS

| | | | | |
|---|---|---|---|---|
| 6,997,645 | B2* | 2/2006 | von Trepka | F16L 1/09 |
| | | | | 405/169 |
| 7,503,727 | B2* | 3/2009 | Ingebretsen | F16L 1/26 |
| | | | | 405/169 |
| 8,052,351 | B2* | 11/2011 | Bird | E21B 43/0107 |
| | | | | 137/317 |
| 8,408,842 | B2* | 4/2013 | Cafaro | E21B 43/013 |
| | | | | 405/158 |
| 2007/0009328 | A1* | 1/2007 | Bastesen | E21B 43/0107 |
| | | | | 405/169 |
| 2011/0005764 | A1* | 1/2011 | Bekkevold | F16L 1/26 |
| | | | | 166/344 |
| 2012/0263541 | A1 | 10/2012 | Lillejordet et al. | |
| 2013/0071191 | A1* | 3/2013 | Buchan | F16L 1/26 |
| | | | | 405/170 |
| 2013/0309015 | A1* | 11/2013 | Mille | E21B 41/0007 |
| | | | | 405/168.1 |
| 2014/0105688 | A1* | 4/2014 | Bastesen | F16L 1/26 |
| | | | | 405/169 |

FOREIGN PATENT DOCUMENTS

| | | | |
|---|---|---|---|
| WO | WO 93/01438 | 1/1993 | |
| WO | WO 94/08166 | 4/1994 | |
| WO | WO 9715773 A1 * | 5/1997 | ............. B23P 19/06 |
| WO | WO 2011/110950 | 9/2011 | |
| WO | WO 2011/114170 | 9/2011 | |
| WO | WO 2011/114172 | 9/2011 | |
| WO | WO 2012/101525 | 8/2012 | |

* cited by examiner

FOUNDATIONS FOR SUBSEA PIPELINE ACCESSORIES

BACKGROUND OF THE INVENTION

This invention relates to marine pipelaying using a pipelaying vessel to lay an offshore pipeline. The invention relates particularly to pipeline accessory structures such as pipeline end terminations and in-line tee assemblies, and to techniques for providing foundations for such accessories on the seabed.

Marine pipelaying techniques that involve fabrication of a rigid pipeline on a vessel are generally categorised as either S-lay or J-lay, although variants and hybrids of those techniques have been proposed and used. The invention may be used in S-lay or J-lay operations and also in reel-lay operations.

The S-lay technique, for example, involves welding together successive pipe joints at a series of working stations in a generally horizontal firing line on the deck of a pipelaying vessel, from which the pipeline is launched into the water over a stinger. A series of tensioners grip the pipe to control its movement relative to the vessel under the load of the pipe catenary extending between the vessel and the seabed.

S-lay is often preferred to J-lay for its inherently greater lay rate. This has led to the development of a variant of S-lay known as 'Steep S-lay', which is adapted for deep- and ultradeep-water applications. As its name suggests, Steep S-lay involves setting the lift-off point of the pipe from the stinger close to vertical.

References in this specification to S-lay are intended to encompass Steep S-lay where the context allows. A Steep S-lay operation will be used in this specification to exemplify the invention.

Pipelines are routinely fitted with accessories during fabrication to provide operational flexibility, to create desired field layouts and to support future field extensions. Such accessories may be disposed at the ends of the pipeline and within it. They include in-line tee assemblies (ILTs or ITAs), pipeline end manifolds (PLEMs), pipeline end terminations (PLETs, sometimes called flowline end terminations or FLETs), tie-in branches, wyes, tees, shutdown valves, pigging connections, pig-launching and pig-receiving equipment and other subsea structures.

Whilst the advantages of the invention are particularly apparent with heavier accessories such as PLETs, the invention will be exemplified in this specification with reference to an in-line tee or ILT. An ILT is a transition device that is used on pipelines and flowlines carrying production oil/gas or water injection fluids. It is a subsea hub for connection to another system, which may be a manifold, a wellhead or a PLET. An ILT is installed in-line with a pipe such as a flowline pipe; it may, for example, effect a connection between the flowline and a wellhead via a subsea jumper or spool.

The main functional parts of an ILT are a connector for making the required connection and a valve to control the flow through the connector. These parts are supported by a frame. The frame may support more than one connector and more than one valve. The total weight of an ILT is typically several tons. Some accessories such as PLETs may weigh tens or even hundreds of tons.

Once on the seabed, the weight of an accessory such as an ILT must not be borne by the pipe that is attached to the accessory. The accessory must instead be supported by a foundation, especially when it is laid on a soft, muddy seabed as is common in deep- and ultradeep-water locations. While supporting the weight of the accessory and external loads, the foundation must keep the accessory and the attached pipes stable by resisting rotation and lateral movement and must also avoid excessive settlement into the seabed.

In deep- and ultradeep-water applications, foundations for pipeline accessories most commonly comprise mudmats. A mudmat typically comprises a horizontal top plate, which is usually rectangular. Mudmats are usually paired, one each side of the pipeline, and are typically 5 m to 10 m in width and 5 m to 20 m in length.

Mudmats may be adapted to slide across the seabed to allow for expansion and contraction of the pipe in use. Alternatively, mudmats may be adapted to dig in to the seabed to locate the mudmat against sliding across the seabed, in which case there may be provision for the supported accessory to move to a limited extent with respect to the mudmat. To resist sliding, the top plate of a mudmat may be provided with a vertical peripheral skirt extending to a depth of up to more than 1 m. There may also be vertical partition walls disposed under the top plate and intersecting the surrounding skirt to stiffen and support the top plate and to improve engagement with the seabed.

A mudmat foundation has to cope with the high centre of gravity of the accessory it supports and the torque that may be applied by jumpers or spools attached to the accessory when in position for use, while keeping the accessory and the pipe stable without becoming embedded in the seabed. In principle, therefore, mudmats should be as long and wide as possible to define a large base area.

However, there are limits on mudmat size imposed by considerations of cost, weight and ease of installation. In this respect, pipeline installation is not solely a pipelaying activity but also involves handling and lowering accessories attached to the pipe. Consequently, the overall speed of pipeline installation is not determined simply by the rate at which a pipelaying vessel can fabricate and lay pipe, but also by the ability of the vessel to install accessories as part of the pipeline.

To ease the integration of large accessories in pipeline installation operations, it has been proposed for pipeline accessories such as ILTs to be fitted with folding mudmats. Such mudmats pass with the accessory along the firing line of a pipelaying vessel and are overboarded in a compact folded configuration. They are then opened into a wider deployed configuration upon, or just before, reaching the seabed. An example of this approach is disclosed in WO 2012/101525.

The folding mudmat solution exemplified by WO 2012/101525 is a good way to exploit the available space on a pipelaying vessel. However, the maximum size of an accessory fitted with folding mudmats is still limited to the space that is available along the firing line of the vessel, meaning that the available mudmat area may not be sufficient to support a heavy accessory.

Another solution is to pass only a part of the accessory structure through open tensioners, grippers or clamps on the firing line of a pipelaying vessel, and then to assemble the full structure, including mudmats, after or downstream of those tensioners, grippers or clamps. However, in addition to limits on the size of structure that may pass along the firing line, the deck layout of the vessel may impose space constraints that hinder or preclude downstream assembly operations.

It is also known to bypass a restriction in the firing line of a pipelaying vessel by passing an accessory over the side of the vessel away from the laying axis and then recovering the accessory to the laying axis downstream of the restriction. This avoids mudmats fitted to the accessory having to pass through the restriction altogether; however, handling a bulky accessory in this way can be a complex and time-consuming operation.

If an accessory structure is launched into the sea with mudmats already fitted to it, the size and stiffness of the mudmats may not be compatible with the bending radius of the pipe on the stinger. This is a problem in S-lay operations in general but is a particular problem in Steep S-lay operations, where the radius of curvature of the stinger is small and the overbend strain experienced by the pipe is correspondingly large.

A solution to these problems is to assemble an accessory and a foundation on the seabed in separate installation operations. One approach to this is disclosed in WO 2011/110950, which is regarded by the inventors as the closest prior art although it actually teaches away from the invention as will be explained. Here, mudmat foundations are pre-installed on the seabed, for example by a crane, and pipeline accessories are docked with the foundations upon laying the pipeline across them. However, managing the operational risk of being unable to unite an accessory with a pre-installed foundation tends to increase the size and weight of the foundation structure. Pre-installation of foundations also creates planning constraints on siting the foundations and routing the pipeline.

Moving on to more distant background art, WO 2011/114170 and WO 2011/114172 disclose techniques for overhauling a flanged coupling of a pipeline. In those disclosures, a pipeline section containing the flanged coupling is lifted from the seabed onto a support frame positioned beside the pipeline. However, the pipeline section containing the flanged coupling needs no permanent foundation: the support frame acts only as a temporary foundation for the overhaul operation and is removed after the flanged coupling has been placed back on the seabed.

GB 2070187 discloses an adjustable foundation structure that is attached permanently to a pipe underwater. Once the structure is positioned on the seabed under the pipe, jacks raise the pipe to a desired height above the seabed. The structure has legs that are driven into the seabed by self-weight and by the weight of the pipe.

WO 94/08166, U.S. Pat. No. 4,147,455 and WO 93/01438 also disclose permanent vertically-adjustable pipe support structures that are installed after the pipe and clamped around it. In these instances, however, the structures are designed to mitigate free-span problems where a pipe spans a depression in the seabed.

The pipe-support structures of GB 2070187, WO 94/08166, U.S. Pat. No. 4,147,455 and WO 93/01438 support only a pipe and not an accessory structure with valves and connectors, which as noted above will typically add several tons to the weight of the pipe. Whilst the feet of these structures are provided with pads, they could not withstand the weight of an accessory without becoming embedded in the soft, muddy seabed that is characteristic of deep- and ultradeep-water locations. Also, these structures cannot be attached to or inserted under a pipe if that pipe is embedded in a soft seabed.

Of course, where pipe-support structures are attached to a pipe directly as in GB 2070187, WO 94/08166, U.S. Pat. No. 4,147,455 and WO 93/01438, it is possible to tolerate considerable inaccuracy in their longitudinal position along the pipeline. However, such a degree of inaccuracy is not permissible when uniting an accessory and a mudmat foundation on the seabed such as is described in WO 2011/110950 mentioned above.

US 2012/0263541 discloses a subsea supporting structure that elevates and supports a pipe above the seabed. The supporting structure can be installed before or after the pipe is laid, although installation under an already-laid pipe can only be done if the pipe already has a sufficient initial elevation above the seabed. Whilst the supporting structure has a mudmat foundation, there is no disclosure of a pipeline accessory: the supporting structure acts directly on the pipe.

BRIEF SUMMARY OF THE INVENTION

It is against this background that the present invention has been devised. Broadly, the invention involves lowering a pipeline including an accessory toward the seabed and then lowering a mudmat foundation toward the seabed for subsea docking with the accessory, preferably at or adjacent the seabed, to provide a permanent foundation support for the accessory.

Thus, the inventive concept involves the installation of a foundation after pipelaying. For this purpose, the apparatus of the invention is divided into two main parts. The first part comprises an accessory incorporated into the pipeline that may include pipework, connectors, other equipment such as valves and an optional frame. The second part comprises a mudmat foundation that is connected at the seabed to the first part, suitably using installation aids. Adjustment and connection systems may be activated by an ROV to align and lock together the first and second parts when they are united on the seabed.

More specifically, the first part of the apparatus may be referred to as an ILT frame assembly and suitably comprises: piping in accordance with a piping and instrumentation diagram; a first frame element that supports pipework and other equipment and that handles loads and may also slide to handle pipe expansion if needed; a deployment installation aid such as a yoke or ladder to aid deployment while managing a residual torsion moment of the pipe; and a temporary support to control embedment due to self-weight.

The first part of the apparatus also includes a guiding system to guide and ease final installation of a mudmat assembly. That mudmat assembly is the second part of the apparatus and comprises: a mudmat foundation; a second frame element to support the ILT frame assembly, to transfer loads to the mudmat foundation and to guarantee pipe expansion if needed; an adjustment system cooperable with the guiding system of the first part to ensure alignment and connection of the first and second parts; and a connection system acting between the first and second parts that enables all structural parts to work together.

Consequently, in one sense, the invention resides in a method of installing a subsea pipeline including an accessory structure that requires foundation support when in use at a seabed location. The method comprises: lowering the accessory structure to the seabed location attached to a pipe being laid; subsequently, lowering a foundation structure to unite the foundation structure with the accessory structure at the seabed location; and with at least one mudmat of the foundation structure landed on the seabed, transferring weight loads of the accessory structure and the pipe to the mudmat to provide a permanent foundation for the accessory structure.

Before and during installation of the mudmat foundation, at least the pipe and possibly also a lower part of the accessory may be allowed to become embedded in the seabed. Temporary interim support may be provided to the accessory to control and limit embedment of the accessory or the pipe into the seabed and to prevent damage to them. Such support may involve the use of one or more buoyancy modules, which also stabilises the accessory and the pipe against a residual torsion moment during their transit through the water column when pipelaying.

Once the mudmat foundation has been docked with the accessory and laid on the seabed, the accessory and the attached pipe can be lifted clear of the seabed to allow their weight to be borne by the foundation. The accessory and the attached pipe may then be able to move longitudinally relative to the mudmats of the foundation if needed.

By positioning a support structure of the foundation structure over the accessory structure, the accessory structure may be lifted from above into engagement with the foundation structure. This movement preferably involves pulling the accessory structure up toward the foundation structure although pushing is also possible, for example using jacks that push the accessory structure from below. Once the accessory structure is lifted, the accessory structure and the foundation structure are locked together. Interim support may then be removed from the accessory, for example by releasing buoyancy modules from the accessory.

Mudmats of the foundation structure are preferably lowered around the accessory structure when the foundation structure is being united with the accessory structure at the seabed location. The foundation structure may also be lowered around a buoyancy module and/or a wire that supports the accessory structure.

The foundation structure may be engaged with at least one guide part of the accessory structure when being united with the accessory structure, so that the foundation structure may be lowered for landing on the seabed while being guided by the engaged guide part. For optimal ease of alignment, the foundation structure may be engaged successively with first and second guide parts of the accessory structure while being lowered.

The inventive concept embraces apparatus that is adapted to perform the method of the invention. In another sense, therefore, the invention resides in a subsea pipeline accessory structure arranged to be docked after pipelaying with a foundation structure. The accessory structure comprises part of a lifting system arranged to act between the docked foundation structure and the accessory structure to lift the accessory structure relative to the foundation structure.

The accessory structure may comprise a guiding system such as at least one guide post upstanding or erectable toward the foundation structure to guide docking movement of the foundation structure. More preferably, there is a first, taller guide post and a second, shorter guide post so that the foundation structure engages with those posts successively while being lowered.

The invention also embraces a subsea foundation structure that is dockable with a pre-installed accessory structure of a subsea pipeline. The foundation structure comprises at least one mudmat and part of a lifting system arranged to act between the docked foundation structure and the accessory structure to lift the accessory structure relative to the mudmat of the foundation structure.

The foundation structure of the invention preferably comprises first and second mudmats spaced by a gap to accommodate the accessory structure on docking. That gap is advantageously bridged by a carriage that may be movable relative to the mudmats along the gap and that supports at least part of the lifting system.

The invention extends to the combination of an accessory structure of the invention with a foundation structure of the invention, the combination comprising a lifting system arranged to act between the accessory structure and the foundation structure, when docked, to lift the accessory structure relative to the, or each, mudmat of the foundation structure.

The lifting system suitably acts on a part of the foundation structure that overlies the accessory structure when docked. Additionally, downwardly-facing locating formations on the foundation structure and upwardly-facing locating formations on the accessory structure may be positioned to engage with each other when the accessory structure is lifted.

An accessory support wire suitably acts through a yoke that is pivotally attached to the accessory structure. A buoyancy module may be tethered by the accessory support wire. The foundation structure suitably surrounds an opening to accommodate one or more of the buoyancy module, the accessory support wire and the yoke at successive stages of docking.

The inventive concept also extends to a subsea pipeline installed by the method of the invention and to a subsea pipeline comprising apparatus of the invention, whether an accessory structure of the invention, a foundation structure of the invention or a combination of an accessory structure and a foundation structure of the invention.

By virtue of the invention, accessories may be laid as part of a pipeline in a largely standard S-lay operation. As those accessories are laid without the mudmat foundation provided by the second part of the apparatus, the S-lay operation can proceed with minimal delays or interruptions and so can be completed quickly. This shortens the weather window that is necessary to complete installation of the pipeline and minimises usage of the pipelaying vessel, which is an extremely expensive asset both to finance and to operate. Then, during a subsequent campaign that may be performed quickly in a short weather window by a smaller and less expensive vessel with lesser lifting capabilities, an ROV helps to execute the operations that are necessary to unite the mudmat foundation with the accessory and to transfer the weight of the accessory through the mudmat to the seabed.

The 'pre-installation' solution described in WO 2011/110950 teaches away from the 'post-installation' concept of the invention, which has many advantages. In relation to the pre-installation solution described in WO 2011/110950, the invention eases planning and removes the operational risk of being unable to unite an accessory with a pre-installed foundation. This allows the size and weight of the foundation to be minimised.

The invention is fully compatible with S-lay procedures. It removes geometrical constraints and potential incompatibilities between the size of the foundation and space around the firing line of a pipelaying vessel, which may be a problem with a folding mudmat solution such as is described in WO 2012/101525.

The invention is most advantageously used in an S-lay operation involving bending the pipe over a stinger, although it is possible for the invention to be used with benefit in other pipelaying operations such as reel-lay or J-lay operations instead.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

Referring firstly to FIGS. 1 to 4 of the drawings, an ILT 10 in accordance with the invention is shown here mounted in-line with a subsea flowline 12. The ILT 10 comprises an elongate lattice frame 14 that supports a pair of connectors 16, one at each end of the frame 14. Each connector 16 has an associated valve 18. Pipework 20 extends from the flowline 12 to the valves 18 and from the valves 18 to the associated connectors 16.

Figure 1:
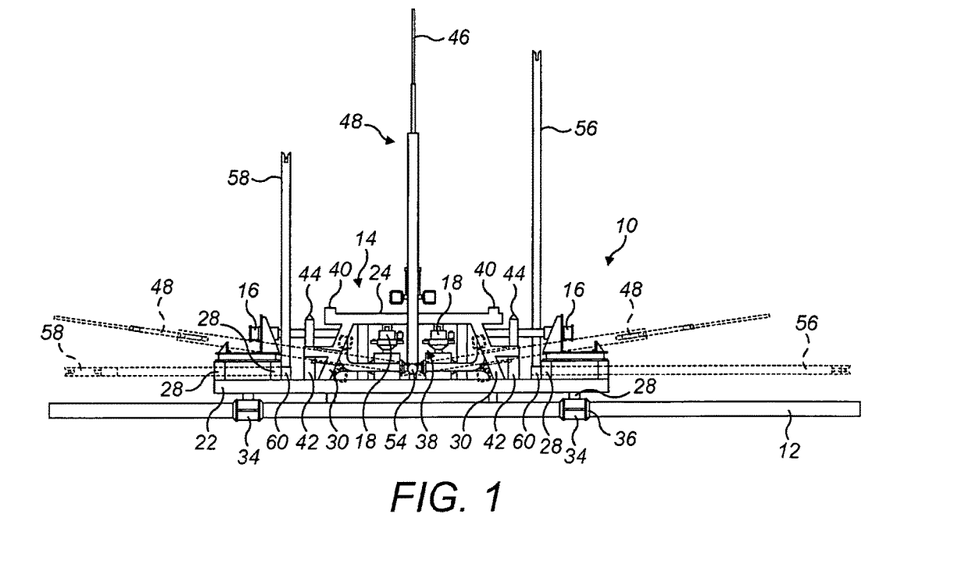
FIG. 1 is a side view of a pipeline accessory in accordance with the invention, in this example being an ILT shown mounted in-line with a subsea flowline.
Figure 2:
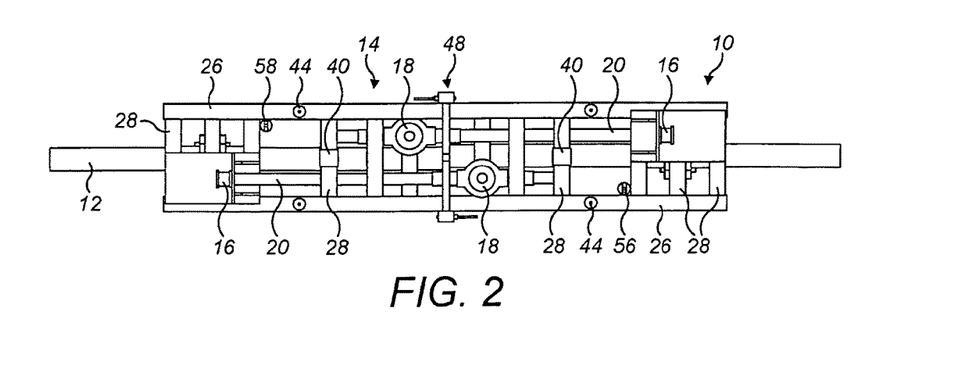
FIG. 2 is a top plan view of the ILT and flowline shown in FIG. 1.
Figures 3, 4:
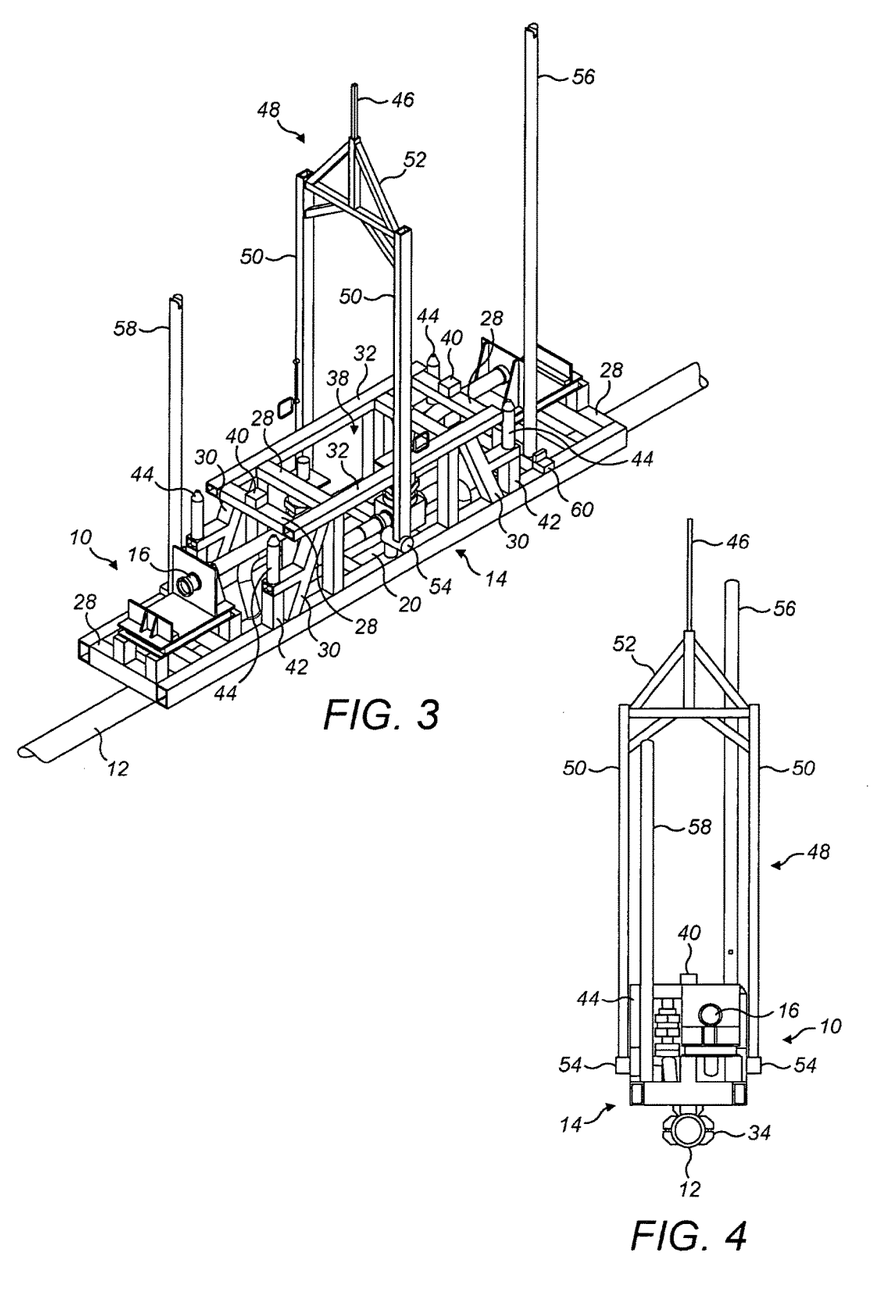
FIG. 3 is a perspective view from above of the ILT and flowline shown in FIGS. 1 and 2.
FIG. 4 is an end view of the ILT and flowline shown in FIGS. 1 to 3.

FIG. 1 shows that the frame 14 of the ILT 10 is largely symmetrical about a central plane that is orthogonal to the longitudinal axis of the flowline 12. FIG. 1 also shows that the frame 14 comprises a full-length lower frame section 22 and a shorter upper frame section 24. The upper frame section 24 is positioned longitudinally centrally with respect to, and lies in a parallel plane spaced above, the lower frame section 22.

The lower frame section 22 comprises parallel lower beams 26 joined in a ladder arrangement by cross-members 28 spaced at longitudinal intervals along them. Opposed pairs of A-frames 30 upstanding from the lower beams 26 support parallel upper beams 32 of the upper frame section 24. The upper beams 32 are also joined by longitudinally-spaced cross-members 28 in a ladder arrangement.

The frame 14 is attached to the flowline 12 by spaced brackets 34 mounted centrally on cross-members 28 of the lower frame section 22. The brackets 34 embrace and clamp location points 36 on the flowline 12. Forged pieces can be used instead of brackets 34 if desired.

Between them, the lower and upper frame sections 22, 24 and the A-frames 30 define a central lattice box 38 that houses the valves 18 and much of the pipework 20. The connectors 16 and some of their associated pipework 20 are longitudinally outboard of that central box 38, with the connectors 16 being supported by raised cross-members 28 of the lower frame section 22.

Upwardly-facing anchor formations 40 are positioned centrally on the outermost cross-members 28 of the upper frame section 24. Each anchor formation 40 comprises an upstanding hollow socket that is a box open to one side, with a slot in a top wall of the box also opening to that open side so that the top wall provides a hook-like engagement shoulder. As best appreciated in FIG. 3, the open sides and slots of the anchor formations 40 face in opposite lateral directions.

Outriggers 42 supported by the lower beams 26 and the A-frames 30 are disposed longitudinally outboard of the A-frames 30. The outriggers 42 support upstanding location pins 44 in a rectangular arrangement.

Lifting force from a crane or winch of a pipelaying vessel and/or from one or more buoyancy modules is applied to the ILT 10 by a wire 46 connected to a yoke 48. The yoke 48 comprises parallel upright legs 50 that straddle the central lattice box 38 of the frame 14. The legs 50 are surmounted and joined by a coplanar triangular bridge 52 to which the wire 46 is releasably connected.

Each leg 50 of the yoke 48 is joined by a respective hinge 54 at its bottom end to a respective lower beam 26 of the frame 14 at a longitudinally central position. Consequently, when the legs 50 are vertical and the frame 14 is horizontal as shown, the legs 50 and the bridge 52 lie on the central plane of symmetry of the ILT 10. The common pivot axis of the hinges 54 substantially coincides with the centre of gravity of the ILT 10.

FIG. 1 shows, in shadow lines, the range of pivotal movement of the yoke 48 about the hinges 54, which enables the ILT 10 to pass along the firing line and through the tensioners of a pipelaying vessel with the yoke 48 attached. The yoke 48 swings up into vertical orientation when the wire 46 is attached downstream of the tensioners and is placed under tension to support the weight of the ILT 10 and the attached flowline 12. The hinges 54 allow the inclination of the ILT 10 and the flowline 12 to match the S-curve of the pipeline from surface to seabed during pipelaying while the wire 46 and the yoke 48 remain vertical.

A tall guide post 56 and a short guide post 58 are joined to respective lower beams 26 of the frame 14 by respective hinges 60 positioned longitudinally outboard of the outriggers 42. The hinges 60 allow the guide posts 56, 58 to be folded longitudinally outwardly to lie parallel to the lower beams 26 of the frame 14, which enables the ILT 10 to pass along the firing line and through the tensioners of a pipelaying vessel with the guide posts 56, 58 already attached.

Again, shadow lines in FIG. 1 show the range of pivotal movement of the guide posts 56, 58 about the hinges 60.

When the ILT 10 has been laid on the seabed with the flowline 12 substantially horizontal, the guide posts 56, 58 can be erected into the parallel vertical orientation shown in FIGS. 1 to 4. The guide posts 56, 58 can be erected by ROV intervention, which movement may be assisted if needs be releasing buoyant elements such as inflatable airbags or small buoys tethered to the guide posts 56, 58. Latch mechanisms are suitably provided to keep the guide posts 56, 58 vertical and parallel. Those latch mechanisms may engage automatically when the guide posts 56, 58 are fully deployed or may be operated by an ROV.

Turning now to FIGS. 5 to 8, these drawings show, in combination, the ILT 10 and flowline 12 of FIGS. 1 to 4 coupled to a foundation structure 62 in accordance with the invention. The wire 46 has been removed from the yoke 48.

The foundation structure 62 shown in FIGS. 5 to 8 comprises a pair of parallel, coplanar mudmats 64 spaced laterally to lie one each side of the ILT 10 and the flowline 12 in use. The mudmats 64 are elongate and rectangular and extend parallel to the flowline 12. As is conventional, each mudmat 64 comprises a horizontal top plate 66 atop a vertical peripheral skirt 68. Vertical partition walls are also typically disposed under the top plate 66 but they are not visible behind the skirt 68 in the views of FIGS. 5 to 8.

A foundation frame 70 stiffens the mudmats 64 and holds them in parallel, coplanar and laterally-spaced relation. The foundation frame 70 comprises three transverse I-section beams 72 spaced longitudinally in parallel relation atop the top plate 66 of each mudmat 64. One transverse beam 72 is at each end of the top plate 66 and the other transverse beam 72 is in the middle of the top plate 66.

Figure 7:
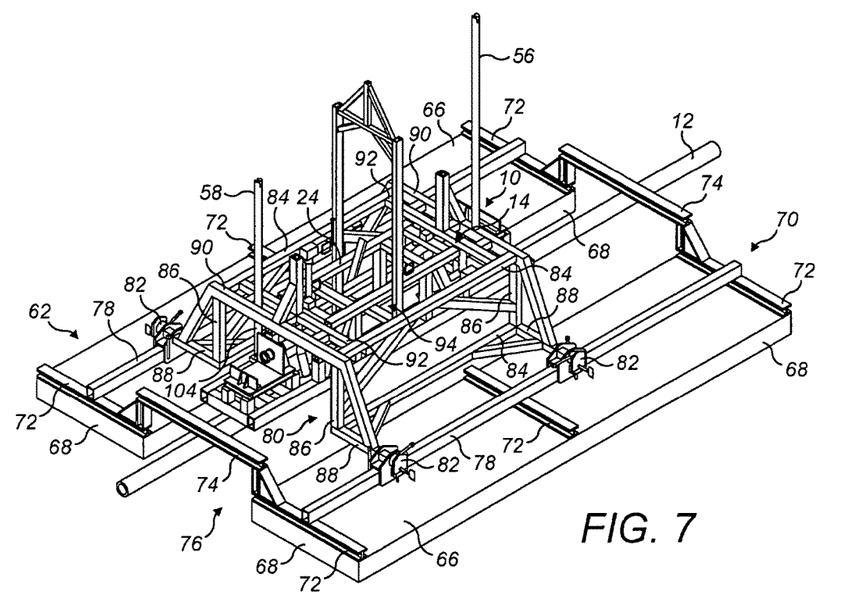
FIG. 7 is a perspective view from above of the combination shown in FIGS. 5 and 6.
Figure 8:
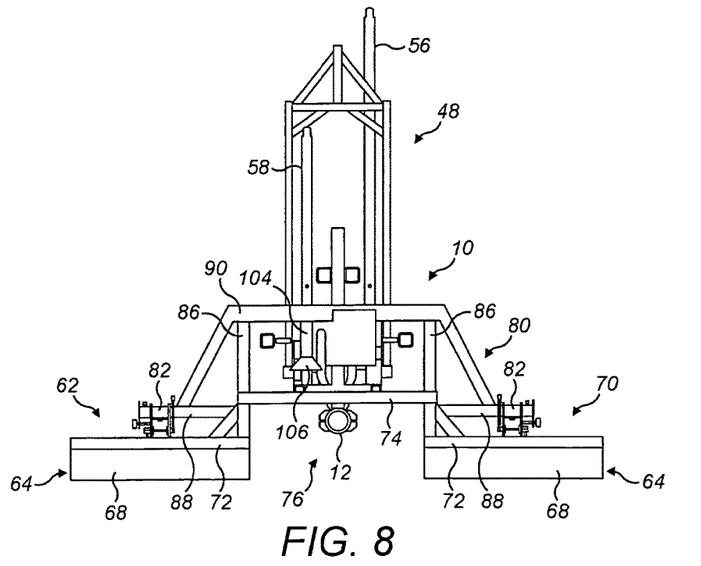
FIG. 8 is an end view of the combination shown in FIGS. 5 to 7.

The foundation frame 70 further comprises raised transverse bridge members 74 that join the transverse beams 72 at the ends of the top plates 66 rigidly to their counterparts on the other mudmat 64 as best shown in FIGS. 7 and 8. The bridge members 74 bound a central gap 76 between the mudmats 64 within which the ILT 10 can move longitudinally with respect to the foundation structure 62 to follow longitudinal expansion or contraction of the flowline 12 in operation.

The transverse beams 72 are surmounted by parallel longitudinal rails 78 that are spaced by the beams 72 above the top plates 66 of the mudmats 64. A carriage 80 runs on sliding sets 82 or roller sets that embrace the rails 78. The carriage 80 bridges the rails 78 to support the ILT 10, which is suspended from the carriage 80 as will be explained. The ILT 10, thus suspended, holds the flowline 12 in turn above the coplanar top plates 66 of the mudmats 64, as best shown in FIG. 8. This ensures that the flowline 12 is raised clear of the seabed when the foundation structure 62 has been installed, as will also be explained.

The rails 78 and the carriage 80 allow the ILT 10 and the flowline 12 to move longitudinally with respect to the mudmats 64. This provision for relative movement is necessary because fluids that flow along the flowline 12 in use are generally much hotter than the surrounding water (circa 70-250 Celsius for oil and circa 30-60 Celsius for injected water) and the flowline 12 is typically very long, often measured in tens of kilometers. Consequently, the length of the flowline 12 can vary by several meters when the flow starts or stops. This longitudinal expansion and contraction must be permitted by the foundation structure 62 to avoid over-stressing the flowline 12 and causing cracks or buckling.

The carriage 80 comprises four longitudinal beams 84 in upper and lower pairs. The upper and lower longitudinal beams 84 on each side are joined to each other by pillars 86 at each end. Braces 88 extend laterally outboard of the pillars 86 to support the sliding sets 82 at the level of the lower longitudinal beams 84.

The upper longitudinal beams 84 of the carriage 80 are joined by four cross-members, namely outer cross-members 90 aligned with the pillars 86 and inner cross-members 92 slightly inboard of the outer cross-members 90. This leaves a central rectangular opening 94 in the top of the carriage 80, best appreciated in FIG. 6, bounded to the sides by the upper longitudinal beams 84 and to the ends by the inner cross-members 92. That opening 94 accommodates the upper frame section 24 of the frame 14 of the ILT 10, as can be seen most clearly in FIG. 7.

Figure 5:
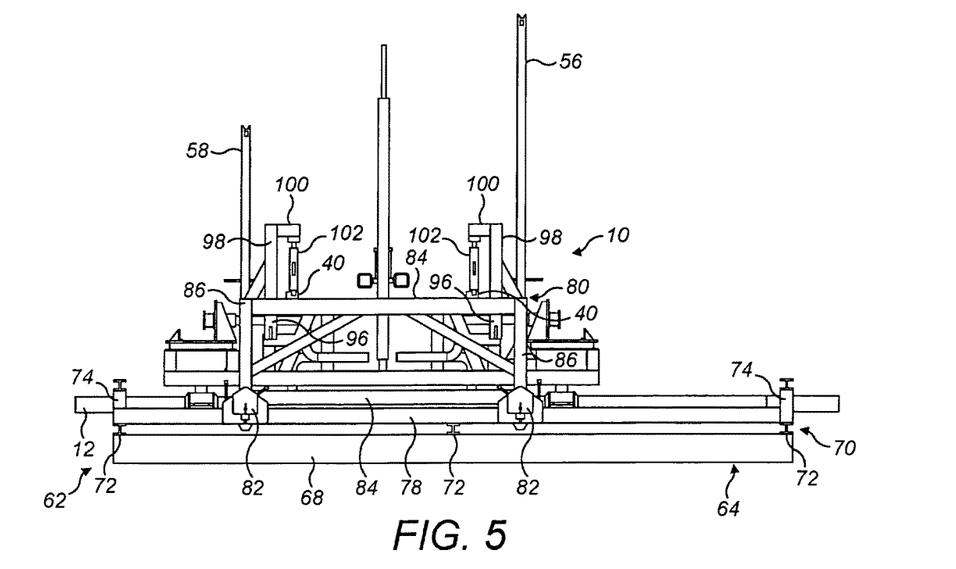
FIG. 5 is a side view of the ILT and flowline shown in FIGS. 1 to 4, in combination with a mudmat foundation structure in accordance with the invention.
Figure 6:
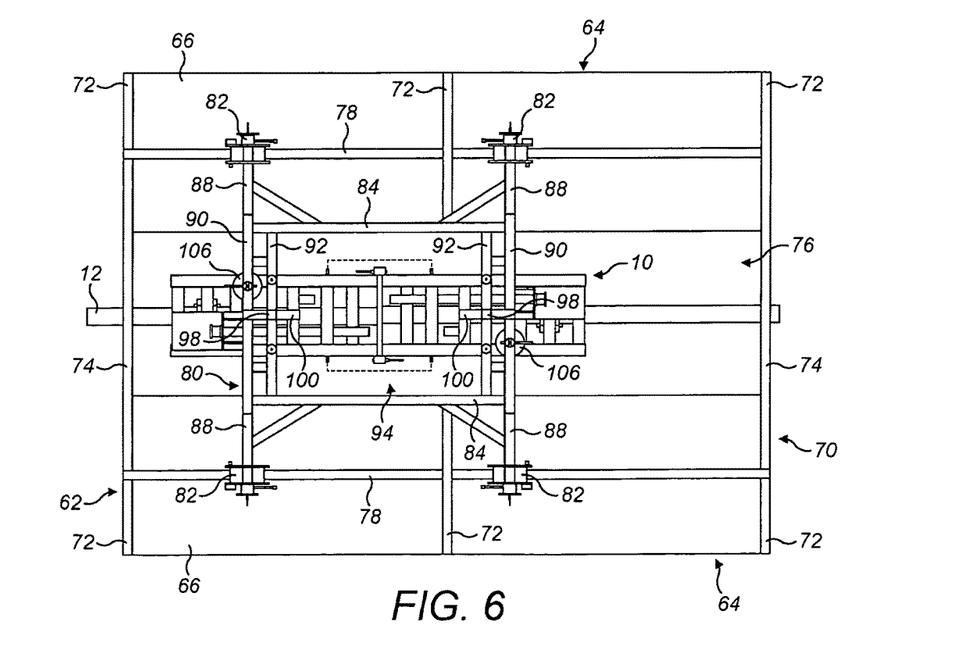
FIG. 6 is a top plan view of the combination shown in FIG. 5.

As best appreciated in FIG. 5, the inner cross-members 92 support downwardly-extending open-bottomed tubular location sockets 96 in a rectangular arrangement. The location sockets 96 are positioned to receive the location pins 44 upstanding from the outriggers 42 on the frame 14 of the ILT 10.

An arm 98 extends upwardly from the middle of each inner cross-member 92 and is braced to the adjacent outer cross-member 90. At its upper end, the arm 98 supports an inboard-facing spur 100 from which a hydraulic jack 102 hangs parallel to and inboard of the arm 98. The jacks 102 are aligned with the upwardly-facing anchor formations 40 on the frame 14 of the ILT 10.

The jacks 102 pull and lift the frame 14 of the ILT 10 into engagement with the carriage 80 of the foundation structure 62. To do so, male formations at the lower ends of the jacks 102 fit into the anchor formations 40 on the frame 14, entering the box-shaped sockets of the anchor formations 40 from opposite lateral directions through the open sides of the boxes to follow the slots in their top walls and to engage under the shoulders thus defined. The jacks 102 are pivotably mounted to the spurs 100 to allow this movement.

The outer cross-members 90 support downwardly-extending open-bottomed guide tubes 104 that are offset laterally to align with and receive respective ones of the guide posts 56, 58 upstanding from the ILT 10. Frusto-conical skirts 106 around the lower ends of the guide tubes 104 lead the guide posts 56, 58 into alignment with the guide tubes 104 as the foundation structure 62 is lowered toward the frame 14 of the ILT 10.

Figure 9:
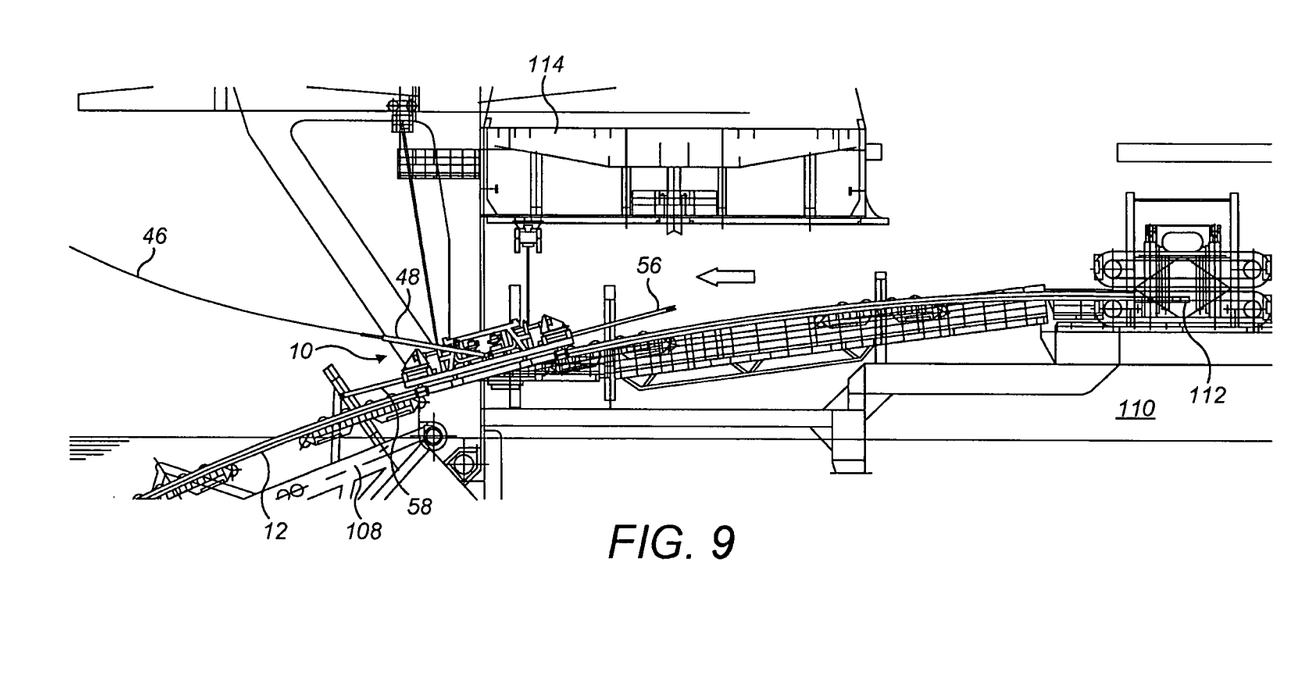
FIG. 9 is an enlarged side view of a pipelaying vessel showing the ILT and flowline of FIGS. 1 to 4 about to be launched from the vessel over a stinger and with a yoke of the ILT connected to a crane of the vessel by a slack line that includes a buoyancy module seen in FIG. 10.
Figures 10, 11:
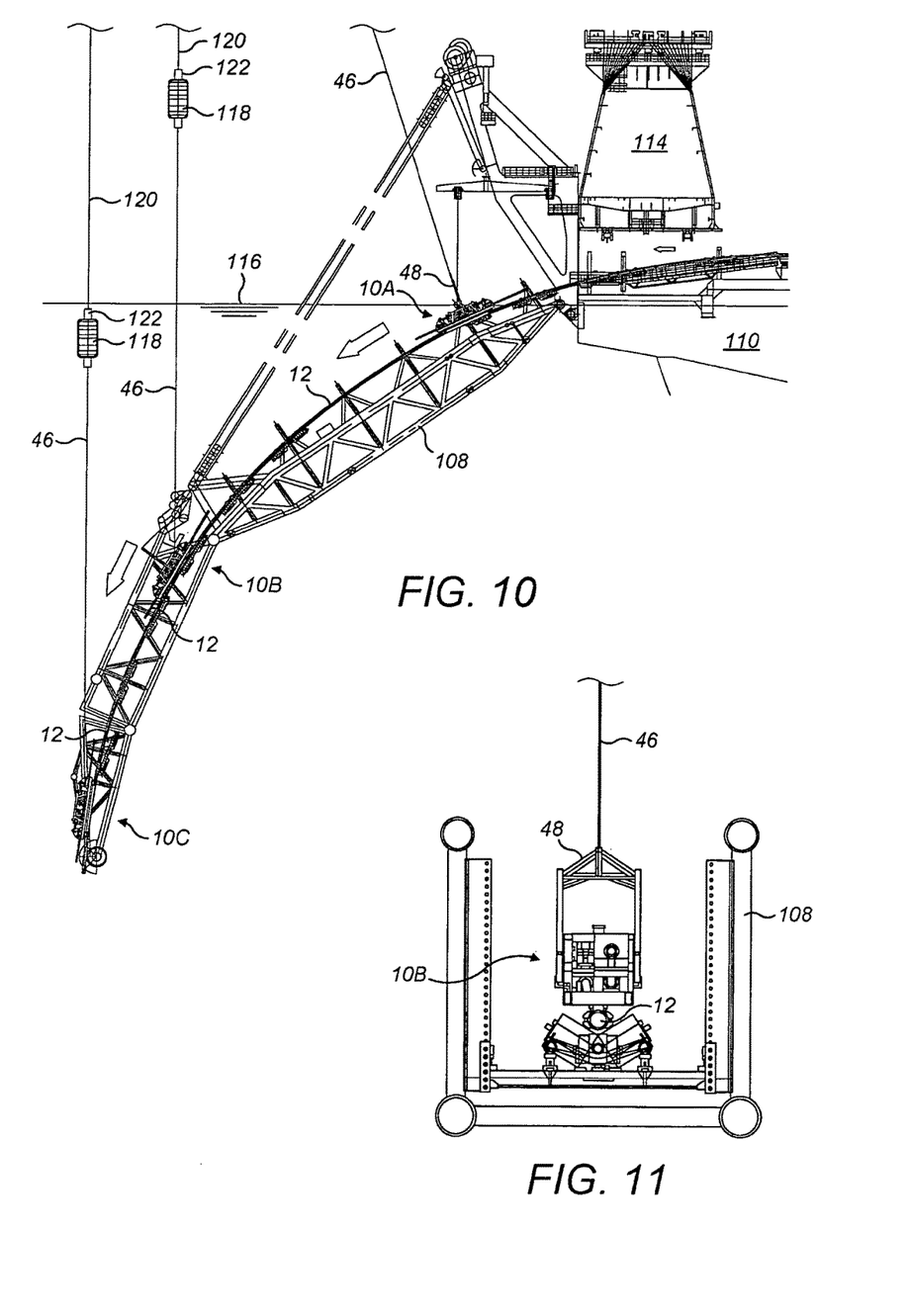
FIG. 10 is a side view of the pipelaying vessel of FIG. 9, showing the ILT and flowline of FIGS. 1 to 4 at successive positions during launch along the stinger with the line including the buoyancy module now taut.
FIG. 11 is a cross-sectional view through the stinger, the ILT and flowline at one of the positions shown in FIG. 10.

FIGS. 9 to 15 of the drawings show various stages of the installation process. Specifically, FIGS. 9 to 11 show the ILT 10 being launched with the flowline 12 over the stinger 108 of a pipelaying vessel 110 that is performing a Steep S-lay operation. Conversely, FIGS. 12 to 15 show the ILT 10 and the flowline 12 after landing on the seabed and their subsequent interaction with the post-installed foundation structure 62.

FIG. 9 shows the ILT 10 and the flowline 12 about to be launched from the pipelaying vessel 110 over the stinger 108. In this view, the ILT 10 has just passed through a series of tensioners 112 on the vessel 110; the last of those tensioners 112 is visible in FIG. 9. To facilitate the passage of the ILT 10 through the tensioners 112, the guide posts 56, 58 were previously folded longitudinally outwardly to lie generally parallel to the flowline 12 and they remain in that position for launching as shown in FIG. 9.

When the ILT 10 has passed through the tensioners 112, the yoke 48 of the ILT 10 is connected to a crane 114 of the vessel 110 by the wire 46. The wire 46 is initially slack as shown in FIG. 9 but it becomes taut as shown in FIG. 10. The yoke 48 tilts to match the local inclination of the wire 46.

FIG. 10 shows the ILT 10 in three positions as it progresses underwater while being launched along the stinger 108, designated here in downstream succession as 10A, 10B and 10C. At the first position, the ILT 10A carried by the flowline 12 has just submerged beneath the surface 116. The wire 46 has now been pulled taut but remains inclined toward a boom of the crane 114, which boom is not visible in FIG. 10. The yoke 48 is now approximately orthogonal to the longitudinal axis of the flowline 12.

At an intermediate position, also shown in cross-section in FIG. 11, the ILT 10B lies under the suspension point of the wire 46 on the boom of the crane 114. The wire 46 and the yoke 48 are therefore now vertical whereas the flowline 12 and the attached ILT 10B are steeply inclined. Also, it is apparent in FIG. 10 that a buoyancy module 118 tethered by the wire 46 is interposed between the ILT 10B and the boom of the crane 114. The buoyancy module 118 is attached to a crane wire 120 by a releasable coupling 122.

At a downstream position, the boom of the crane 114 has luffed outwardly to keep the wire 46 vertical as the ILT 10C nears the lift-off point at the end of the stinger 108. The flowline 12 and the attached ILT 10C are now near-vertical and the buoyancy module 118 has just submerged, while still being attached to the crane wire 120.

After passing the lift-off point, the ILT 10 is supported by the free span of the flowpipe 12 that hangs as a catenary from the stinger 108 to the seabed. During transit to the seabed, the buoyancy module 118 acting through the yoke 48 keeps the ILT 10 upright and positioned over the flowline 12. The yoke 48 hinges to allow for changes in the inclination of the flowline 12 and the attached ILT 10 while following the catenary shape.

During initial descent of the ILT 10 through the water column after passing the lift-off point, the crane 114 continues to support the ILT 10 through the wires 46 and 120 and the buoyancy module 118. However, the wire 120 from the crane may go slack at some point, depending on the general balance of the system and tolerances on buoyancy—for example, if the buoyancy module 118 is very buoyant.

When the buoyancy module 118 is at a mid-water location, the releasable coupling 122 is operated by an ROV to separate the crane wire 120 from the buoyancy module 118. Alternatively, the crane wire 120 may be separated from the buoyancy module 118 when the buoyancy module 118 is just below the surface or the splash zone, where in principle the releasable coupling 122 could be operated by a diver. The crane wire 120 is then retracted back to the surface for other duties whereupon the buoyancy module 118 provides sole supplementary support to the ILT 10, additional to the support of the flowline 12, as the flowline 12 approaches and lands on the seabed.

Figure 12:
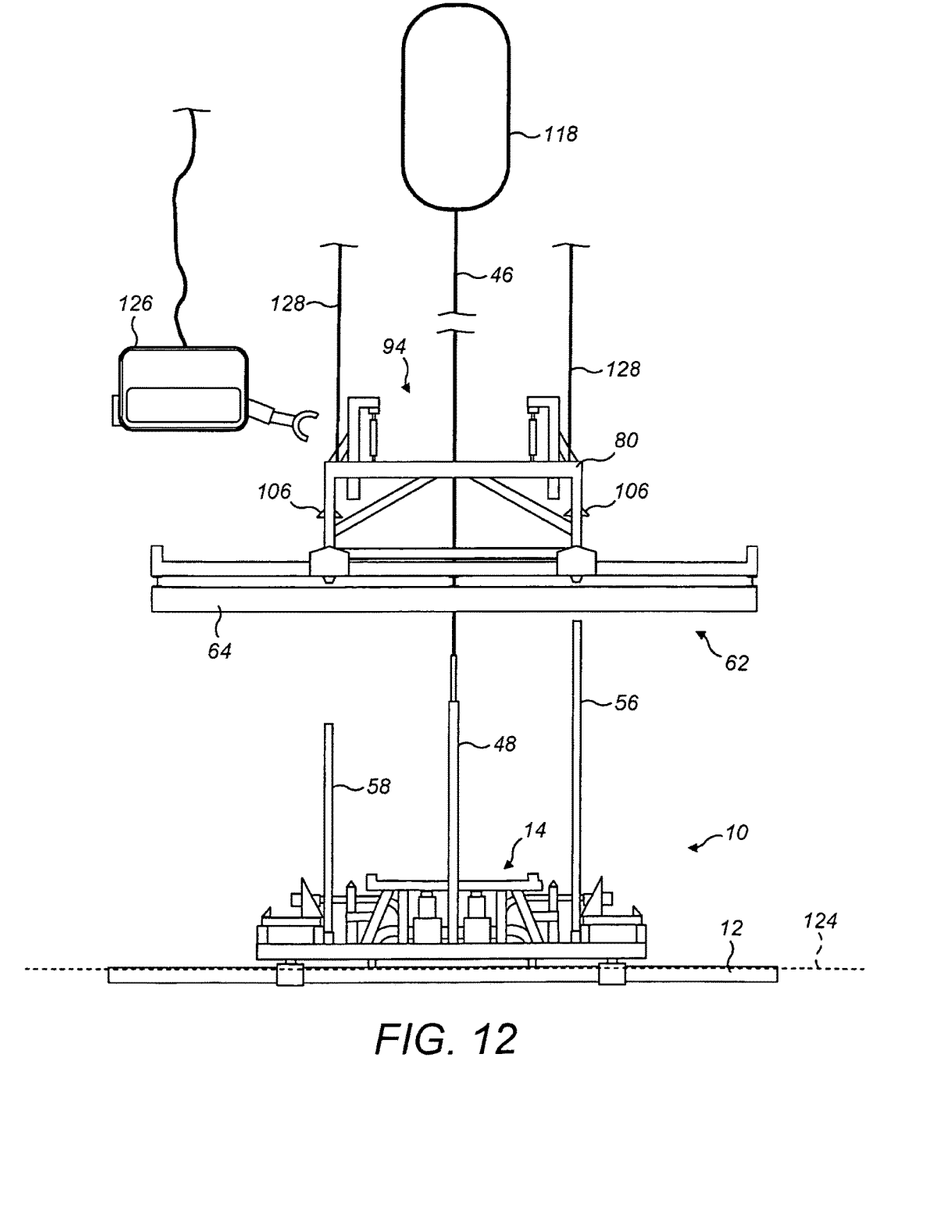
FIG. 12 is a side view showing the foundation structure of FIGS. 5 to 8 approaching the ILT and flowline of FIGS. 1 to 4, which have been pre-laid and partially embedded in the seabed while having temporary support from a buoyancy module.

With reference now to FIG. 12 of the drawings, the buoyancy module 118 remains attached by the wire 46 to the yoke 48 of the ILT 10 after the flowline 12 lands on the seabed 124. FIG. 12 shows that the flowline 12 temporarily embeds in the seabed 124 upon landing.

The depth of embedment is controlled by the buoyant upthrust of the buoyancy module 118. Uncontrolled and excessive embedment of the flowline 12 would be undesirable as it could overstress the flowline 12 and hinder its subsequent lifting from the seabed 124. However, limited temporary controlled embedment of the flowline 12 is desirable to impart tie-back force on the flowline 12 during laying and to keep the flowline 12 in a desired position after laying.

By way of example, the buoyant upthrust of the buoyancy module 118 may be such that, when laid on the seabed 124, the apparent net weight of the assembly of the ILT 10 and the corresponding portion of the flowline 12 is between 0 and 0.5 tons. This represents neutral to slightly negative buoyancy. Calculations forecast that on a typically soft seabed 124, the flowline 12 will embed under this apparent weight up to a depth that approximates to its outer diameter.

Once the flowline 12 is fully laid, the pipelaying vessel 110 shown in FIGS. 9 and 10 can depart for other duties. This leaves the flowline 12 with attached accessories such as the ILT 10 on the seabed for the subsequent addition of foundations such as the foundation structure 62 also shown in FIG. 12. That operation will typically be performed during a separate campaign and probably by a different surface vessel.

At any time between laying the flowline 12 and adding the foundation structure 62, the guide posts 56, 58 on the frame 14 of the ILT 10 are erected or deployed by intervention of an ROV 126 and are latched in the vertical orientation shown in FIG. 12.

FIG. 12 shows the foundation structure 62 being lowered toward the ILT 10 for docking while being guided laterally and longitudinally by an ROV 126. At this stage, the foundation structure 62 is supported by a crane or winch of a surface vessel. The surface vessel is not shown in FIG. 12 but parallel wires 128 supporting the foundation structure 62 are shown. Those wires 128 may, for example, hang from a spreader structure some distance above, which is supported by the crane or winch of the surface vessel.

It will be noted in FIG. 12 that the foundation structure 62 is lowered successively around the buoyancy module 118, the wire 46 and the yoke 48, each of which can fit through the central rectangular opening 94 in the top of the carriage 80 of the foundation structure 62. In FIG. 12, the foundation structure 62 is shown having cleared the buoyancy module 118 and moving down along the wire 46. The guide tubes 104 of the foundation structure 62, whose frusto-conical skirts 106 are visible, are aligned with the respective guide posts 56, 58 upstanding from the ILT 10, but have not yet been lowered on to the guide posts 56, 58 to be engaged with them.

Figure 13:
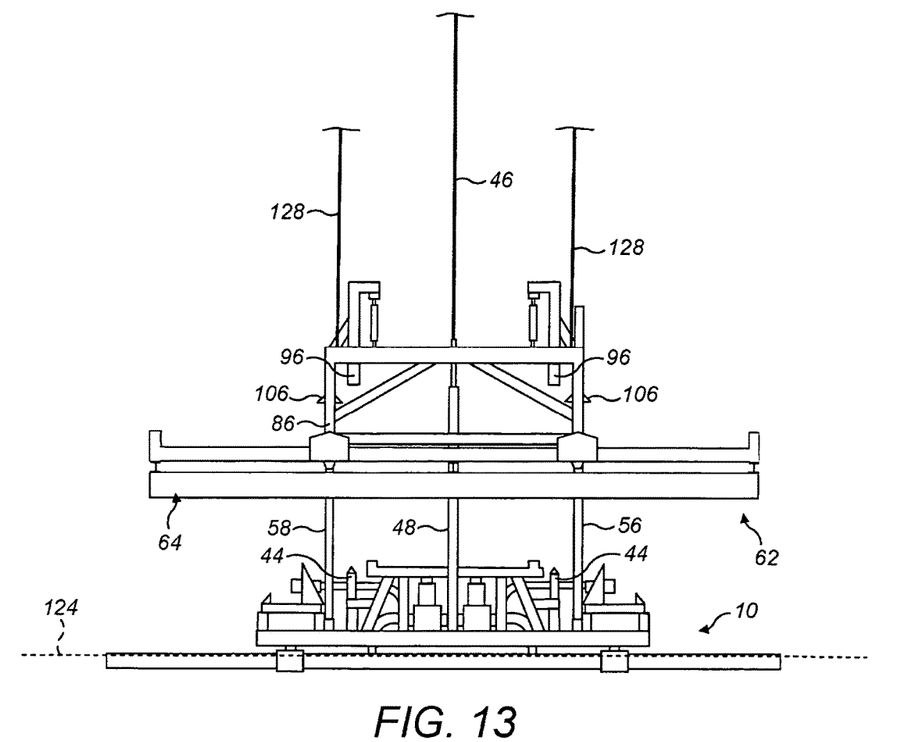
FIG. 13 corresponds to FIG. 12 but shows the foundation structure engaged with one guide post of the ILT and approaching the seabed.

FIG. 13 shows the foundation structure 62 lowered further toward the ILT 10 such that the tall guide post 56 of the ILT 10 has now entered the associated guide tube 104 of the foundation structure 62, assisted by its skirt 106. The top of the tall guide post 56 is protruding from the top of that guide tube 104. Although hidden by a pillar 86 of the foundation structure 62, the top of the short guide post 58 is nearing the skirt 106 of the other guide tube 104 at this stage. The foundation structure 62 can be pivoted around the tall guide post 56 to align it with the short guide post 58 if necessary.

Entry of both guide posts 56, 58 into the respective guide tubes 104 ensures vertical alignment between the location pins 44 of the ILT 10 and the location sockets 96 of the foundation structure 62. Guidance from the ROV 126 is no longer needed, as the descending foundation structure 62 follows the guide posts 56, 58 until the mudmats 64 land on the seabed 124 as shown in FIG. 14.

Figure 14:
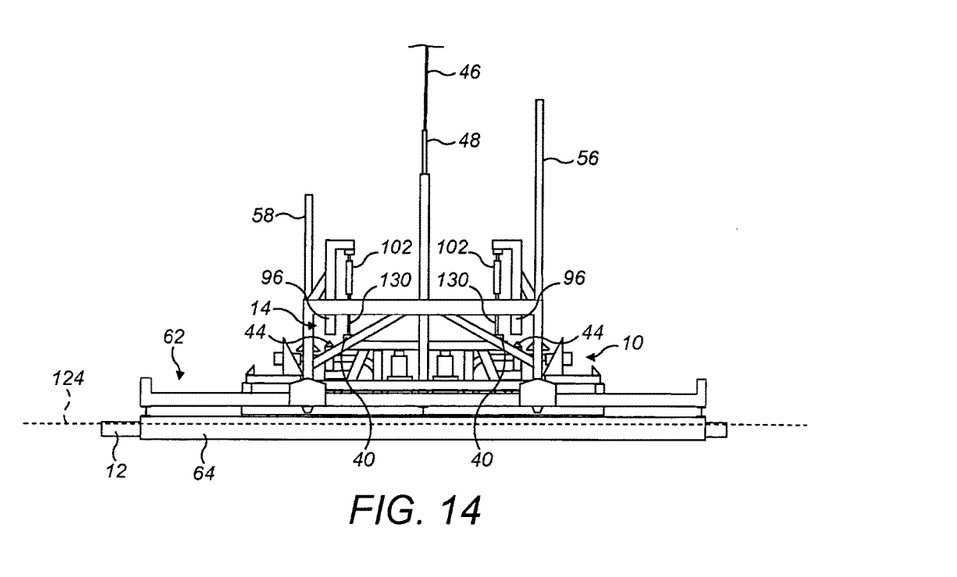
FIG. 14 corresponds to FIG. 13 but shows the foundation structure engaged with two guide posts of the ILT and with its mudmats embedded partially in the seabed, with jacks of the mudmat foundation structure also engaged with the ILT.

FIG. 14 shows the mudmats 64 embedded to a partial extent under the self-weight of the foundation structure 62. FIG. 14 also shows rods 130 of the hydraulic jacks 102 extended to engage the anchor formations 40 on the frame 14 of the ILT 10 as previously described. The location pins 44 of the ILT 10 are now just below the location sockets 96 of the foundation structure 62.

Once the mudmats 64 have landed on the seabed, the ROV 126 shown in FIG. 12 can detach the wires 128 that suspended the foundation structure 62 on its descent from the surface. In this respect, it will be noted that the wires 128 are omitted from FIG. 14.

To prevent the flowline 12 embedding too far into the seabed 124, the wire 46 that tethers the buoyancy module 118 remains attached to the yoke 48 of the ILT 10 at least until the hydraulic jacks 102 engage the anchor formations 40 of the ILT 10. The wire 46 is shown still attached to the yoke 48 in FIG. 14 but has been removed from the yoke 48 in FIG. 15.

Figure 15:
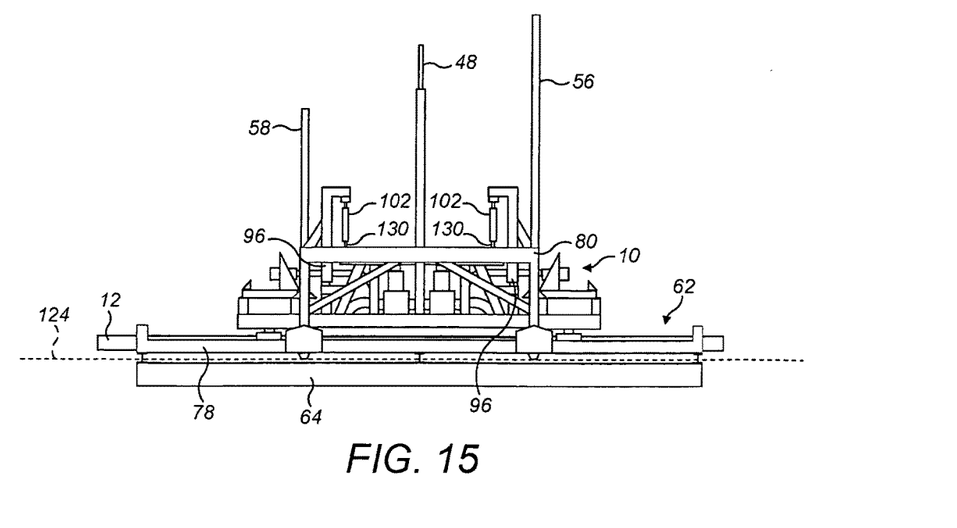
FIG. 15 corresponds to FIG. 14 but shows the jacks of the foundation structure retracted to lift the ILT and the flowline clear of the seabed while mudmats of the foundation structure are embedded fully in the seabed.

Turning finally, then, to FIG. 15 of the drawings, this shows the rods 130 of the jacks 102 retracted to pull and lift the ILT 10 into engagement with the foundation structure 62, specifically with the carriage 80 of the foundation structure 62 that straddles and supports the ILT 10 hanging beneath. The location pins 44 of the ILT 10 have now entered and engaged within the location sockets 96 of the foundation structure 62. That engagement locks together the ILT 10 and the foundation structure 62 both longitudinally and laterally.

Latches can be operated or inserted automatically or by the ROV 126 to hold the ILT 10 and prevent the ILT 10 dropping away from the carriage 80 when hydraulic pressure in the jacks 102 is released. Suitable latches may be associated with the jacks 102 and/or may be located elsewhere at the interface between the ILT 10 and the foundation structure 62.

FIG. 15 shows how raising the ILT 10 lifts the attached flowline 12 clear of the seabed 124. This clearance between the flowline 12 and the seabed 124 allows the flowline 12, including accessories such as the ILT 10, to move longitudinally with the carriage 80 relative to the mudmats 64 of the foundation structure 62 along the rails 78 if needed. This clearance also ensures that loads of the ILT 10 are transmitted to the seabed 124 through the foundation structure 62 and not through the flowline 12.

If the flowline 12 is embedded in the seabed 124 to a depth near its diameter, the jacks 102 must be capable of lifting the ILT 10 and the attached flowline 12 by more than the diameter of the flowline 12, including some tolerance. Typically, the displacement or stroke of the jacks 102 may be around 50 cm, although this example does not limit the scope of the invention.

As the weight of the ILT 10 and the adjoining length of the flowline 12 transfers through the foundation structure 62 to the seabed 124, the mudmats 64 embed further into the seabed 124 as will be apparent from a comparison of FIGS. 14 and 15. A ballast system could also be used if required to ensure total penetration of the foundation structure 62. The ILT 10 and the flowline 12 are now installed, supported by a firm foundation and ready for operation.

Variations are possible within the inventive concept. For example, as is well known, more than one buoyancy module could be used to support an ILT during its descent. Buoyancy modules could be tethered to respective yokes, one at each end of the ILT.

Whilst each of the two main parts of the apparatus has a distinct primary function as described above, it could also have a secondary function of working with the other part to perform the primary function of that other part. For example, an accessory structure of one part could also include a foundation component. Similarly, with the aid of interconnectors that operate on uniting the parts, a foundation structure of another part could also include an accessory component such as a frame element or even some of the functional pipework or equipment of the accessory.

Whilst the system described in this specification for lifting the accessory structure comprises jacks supported by the foundation structure, jacks or other actuators of such a system could instead be supported by the accessory structure. It is also possible for parts of the lifting system to be distributed between the foundation structure and the accessory structure.

Whilst the embodiment illustrated above has two jacks in vertical alignment with the flowline pipe, more than two jacks or other actuators could be employed. It is also possible for at least one jack or other actuator to be offset laterally from the flowline pipe. For example, four jacks could be arranged in two pairs, with each jack being offset laterally from the flowline pipe. This introduces the possibility of moving the jacks to different extents to accommodate tilt tolerances, with an ability to tilt or orient the flowline, the accessory structure and/or the foundation structure slightly to compensate for torsion.

A carriage supported for movement on rails and sliding sets will only be needed if projected expansion of the flowline makes this necessary. If sliding mudmats are used, rails and sliding sets will not be needed and a fixed frame may be used instead.

Guide posts are merely examples of guide formations. After launching the accessory structure, the guide posts could be deployed by a winch or a crane of an installation vessel. The guide posts may be hinged up from the accessory structure to erect them; it is also possible for the guide posts to be assembled with the accessory structure with ROV assistance at a subsea or seabed location.

The invention claimed is:

1. A method of installing a subsea pipeline including an accessory structure that requires foundation support when in use at a seabed location, the method comprising:
    lowering the accessory structure to the seabed location attached to a pipe being laid, the accessory structure comprising at least one valve for controlling fluid flow;
    subsequently, aligning a foundation structure with the accessory structure to enable a lifting device of the foundation structure to be connected between the foundation structure and the accessory structure when the foundation structure is subsequently lowered towards the accessory structure;
    lowering the aligned foundation structure towards the accessory structure;
    connecting the lifting device to connection points of the accessory structure to act directly between the accessory structure and the foundation structure to unite the foundation structure with the accessory structure at the seabed location; and
    with at least one mudmat of the foundation structure landed on the seabed, operating the lifting device to transfer weight loads of the accessory structure and the pipe to the mudmat to provide a permanent foundation for the accessory structure.

2. The method of claim 1, further comprising temporarily embedding the pipe and/or the accessory structure in the seabed at the seabed location.

3. The method of claim 1, further comprising lifting the pipe and/or the accessory structure from the seabed after the foundation structure is united with the accessory structure.

4. The method of claim 1, wherein the at least one mudmat comprises a plurality of mudmats, the method further comprising lowering the plurality of mudmats of the foundation structure around the accessory structure when the foundation structure is being united with the accessory structure at the seabed location.

5. The method of claim 1, further comprising positioning a support structure of the foundation structure adjacent to the accessory structure, the support structure comprising the lifting device, and using the support structure to lift the accessory structure into engagement with the foundation structure.

6. The method of claim 5, further comprising positioning the support structure over the accessory structure and using the support structure to lift the accessory structure from above into engagement with the foundation structure.

7. The method of claim 1, further comprising pulling or pushing the accessory structure toward the foundation structure.

8. The method of claim 1, further comprising engaging the foundation structure with at least one guide part of the accessory structure when being united with the accessory structure and lowering the foundation structure for landing on the seabed while being guided by the engaged guide part.

9. The method of claim 8, wherein the at least one guide part comprises first and second guide parts, the method further comprising engaging the foundation structure successively with the first and second guide parts of the accessory structure while lowering the foundation structure.

10. The method of claim 8, further comprising attaching the, or each, guide part to the accessory structure or erecting the, or each, guide part from the accessory structure after passing the accessory structure through a tensioning apparatus of a pipelaying vessel and before uniting the foundation structure and the accessory structure.

11. The method of claim 1, further comprising locking the accessory structure to the foundation structure after uniting the foundation structure and the accessory structure.

12. The method of claim 1, further comprising providing support to the accessory structure at the seabed location to oppose loads of the accessory structure and the pipe before uniting the foundation structure with the accessory structure.

13. The method of claim 12, further comprising using the support to control temporary embedment of the pipe and/or the accessory structure in the seabed.

14. The method of claim 12, further comprising removing the support when transferring the weight loads of the accessory structure and the pipe to the foundation structure.

15. The method of claim 12, wherein the support is provided by buoyancy that also supports the accessory structure while it is being lowered to the seabed location during pipelaying.

16. The method of claim 15, further comprising lowering the foundation structure around a buoyancy module and/or a wire that supports the accessory structure.

* * * * *